United States Patent [19]
Gerrans

[11] 3,809,530
[45] May 7, 1974

[54] DRYING APPARATUS
[75] Inventor: William A. Gerrans, Colusa, Calif.
[73] Assignee: Carl J. Fusco, Santa Rosa, Calif.
[22] Filed: Jan. 3, 1972
[21] Appl. No.: 214,578

[52] U.S. Cl. .................. 432/152, 34/195, 432/57
[51] Int. Cl. .................. F27b 9/24, F26b 11/18
[58] Field of Search .......... 263/40, 8; 34/75, 195, 34/208; 99/474; 432/57, 124, 125, 152, 299

[56] References Cited
UNITED STATES PATENTS

| | | | |
|---|---|---|---|
| 1,695,991 | 12/1928 | Bennett | 34/208 |
| 418,079 | 12/1889 | Sprout | 34/208 |
| 2,007,604 | 7/1935 | Harris | 263/8 R |
| 2,691,278 | 10/1954 | Knight, Jr. | 34/208 X |
| 2,967,702 | 1/1961 | Flotgen | 263/40 R |
| 3,116,122 | 12/1963 | Oetjen et al. | 34/75 X |
| 2,001,703 | 5/1935 | Brown | 34/208 |

Primary Examiner—John J. Camby
Attorney, Agent, or Firm—Paul B. Fihe

[57] ABSTRACT

Drying apparatus which includes a housing forming a continuous closed-loop conduit within which a drying fluid can be recirculated over a product placed within the housing, the housing incorporating means enabling continuing egress of moisture to the exterior environment without substantial heat loss.

13 Claims, 7 Drawing Figures

PATENTED MAY 7 1974 3,809,530
SHEET 1 OF 2
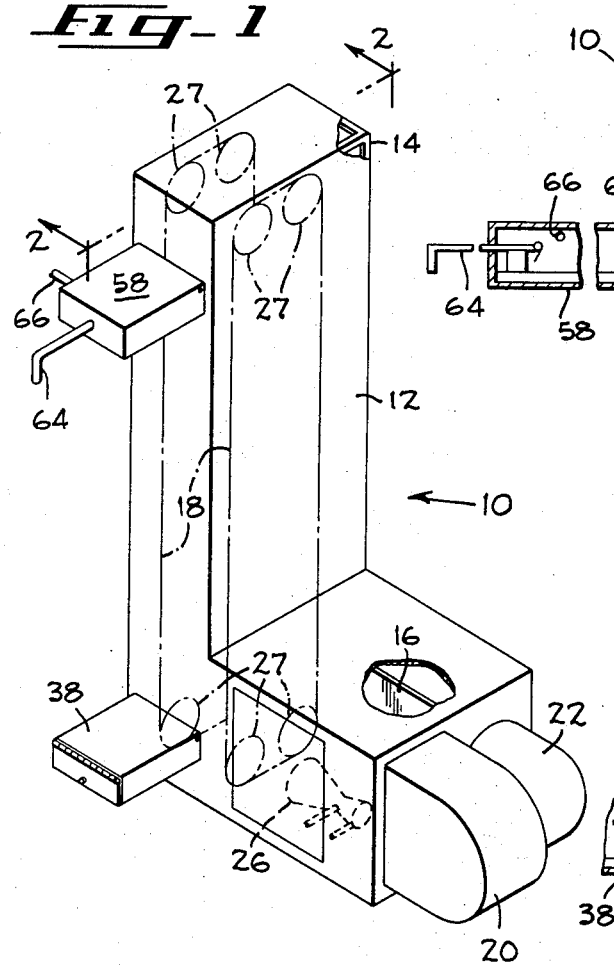
Fig_1
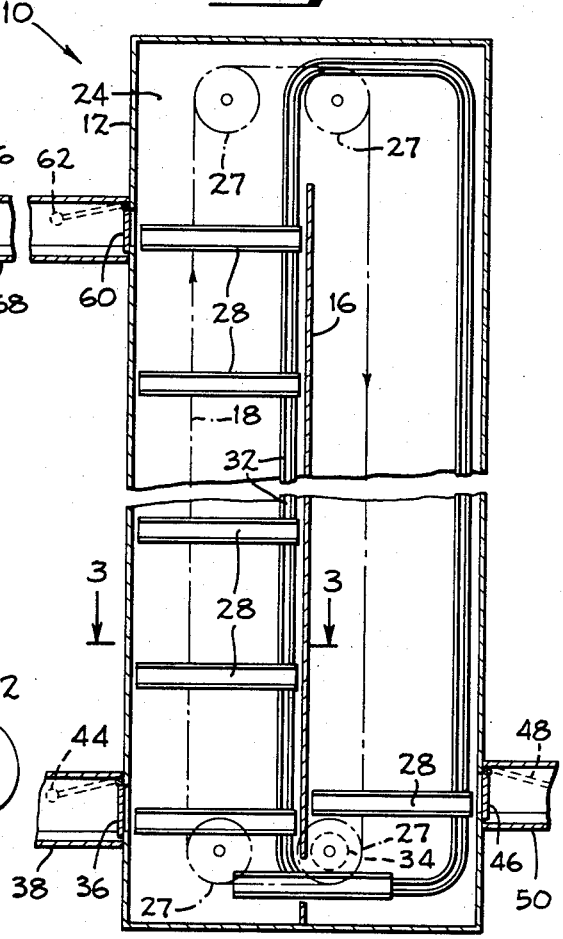
Fig_2
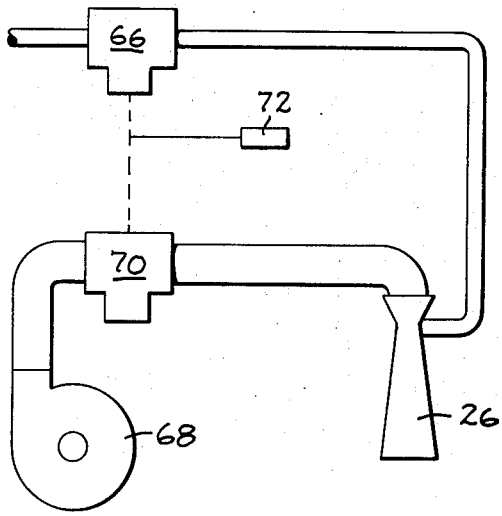
Fig_4
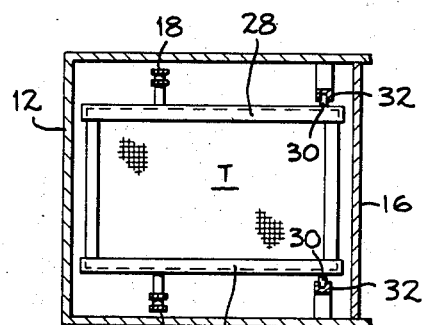
Fig_3

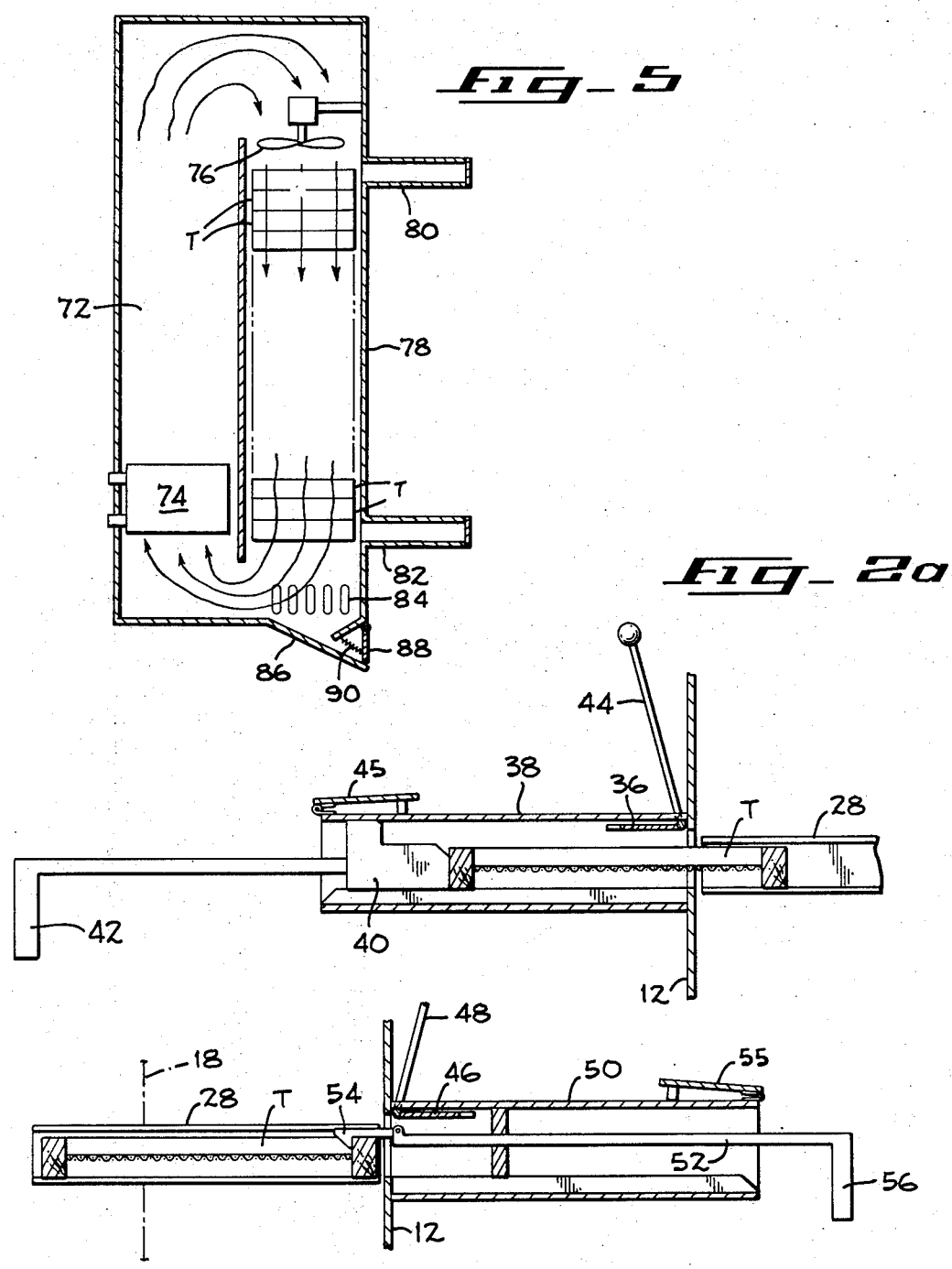

DRYING APPARATUS

FIELD OF THE INVENTION

The present invention relates generally to drying apparatus, and more particularly, to drying apparatus primarily utilized for the dehydration of fruits, vegetables and other products in solid or liquid form.

BACKGROUND OF THE INVENTION

Conventional drying apparatus, whether it be in the form of the common household clothes dryer or the large, commercial dryer commonly utilized in connection with the dehydration of prunes and other fruits and vegetables, operates in the same general fashion. The clothes, prunes or other articles are placed in the path of a moving drying fluid most commonly in the form of heated air to which the moisture is transferred and the moisture-laden air or other fluid is ultimately discharged through an exhaust conduit.

While such drying procedure is relatively simple and straightforward so as to be entirely acceptable for the drying of clothes and moreover, to the present time, has presumably been the most efficient and lowest cost method for the drying of prunes and other fruit and vegetables, certain disadvantages in the drying or dehydration of prunes or other fruits and vegetables are apparent. Taking prunes as an example, the harvesting period normally extends for no more than 6 weeks during which time the fruit must be removed from the trees and rapidly processed, preferably within 24 hours, into the dried fruit form so as to preserve flavor and also to enable storage over an extended period of time under ordinary atmospheric conditions. When it is noted that some 450,000 tons of prunes must be processed in that 6-week period, the problems both of rapid processing and economy in such processing will be recognized as extremely critical. In a conventional prune drying operation, stacked trays, each of which carries a single layer of the green fruit, are placed in a tunnel dryer and are gradually moved therethrough from an entrance to an exit end while heated air is passed thereover. Typically, the air at the entrance end of the tunnel is at a temperature of approximately 170°F and is exhausted after the drying heat transfer at a temperature of approximately 135°F. Since normal ambient temperatures are always considerably below the latter temperature, it is apparent that substantial heat loss is experienced, and moreover, a drying time between 15 and 20 hours is requisite to reduce the initial moisture content of the fruit (approximately 60 percent) to the desired dried fruit level (approximately 20 percent). Inherent limitations exist on the speed of drying; if the temperatures are raised, a caramelization of the fruit and consequent deleterious effects on its flavor are experienced; if a higher air velocity is utilized which will advantageously reduce the weight and sugar loss of the dried product, the exit temperature will obviously be higher thus to reduce the efficiency of drying to produce ultimately a higher drying cost. As a consequence, the stated drying conditions are considered optimum in the industry. However, because of the extended drying time, the drying or dehydration as described, has been considered the "bottleneck" in the processing of green fruit, and accordingly has been considered the paramount problem in the processing of prunes.

Yet additional deleterious effects result specifically from the use of heated air in the drying process as described. Initially, it will be obvious that the input heated air itself contains a certain amount of moisture depending upon the relative humidity at the particular time of the processing, which will further reduce the drying efficiency. Furthermore, the environmental air obviously contains oxygen which at the elevated drying temperatures accelerates enzymatic action which is particularly harmful to the flavor of certain fruits and vegetables such as, for example, halved apricots.

Accordingly, although heated air has been utilized in tunnel dryers for a considerable number of years, and no reasonable substitute has heretofore been provided in terms of efficiency and excellence of the finished product, the noted severe disadvantages exist.

SUMMARY OF THE PRESENT INVENTION

Generally, it is the objective of the present invention to provide a drying apparatus which not only performs the drying operation in a rapid and efficient manner but also avoids any deleterious effects on the flavor of the dried fruits or vegetables. Briefly, this objective is achieved by disposing the fruit, vegetables or other product to be dehydrated in the path of a drying fluid containing substantially no oxygen. The path of the drying fluid is a closed recirculating path so that substantially all of the heat transfer is consumed in the dehydration process rather than being exhausted to the external environment. Such recirculating path is formed within a housing which is structurally arranged to form a continuous closed loop conduit through which the drying fluid is continuously recirculated by a suitable fan or other fluid moving device. A burner is arranged at one point to introduce the drying fluid to provide a heat source and preferably takes the form of an inert gas generator which produces the heated drying fluid. The term "inert gas" as utilized herein is used to denominate a gas having substantially no oxygen contained therein and can readily be achieved by the controlled intermixture of a fuel such as propane or other gas and dried air which supports combustion thereof. The amount of air is maintained at a level such that all of the oxygen in the air is consumed in the burning process whereby the combustion product is such an "inert gas." The product, depending upon its nature, is carried through the conduit in parallel or counter-current flow with respect to the inert drying fluid. As the drying fluid passes over and around the product within the closed loop conduit, moisture is transferred from the product into the drying fluid and is subsequently extracted from the fluid for transfer to the exterior environment without substantial heat loss. In one embodiment of the invention, at least a portion of the housing walls constitute a moisture permeable membrane which, in practice, can take the form, for example, of standard ¾ inch exterior plywood or any other material whose interstices are of sufficient size to permit the passage of moisture therethrough. This transfer of moisture through the moisture permeable walls to the housing exterior is the result of two conditions. Firstly, the controlled constant input of the drying fluid into the housing creates a slightly positive pressure (one or more inches of mercury above atmospheric) and secondly, because the drying fluid is heated, a temperature gradient exists between the interior of the housing and its exterior. Although such a moisture-permeable membrane permits the transfer of moisture therethrough in the manner explained hereinabove, the amount of heat transferred therethrough is minimal, tests having shown that the temperature at the exterior of the plywood is elevated but 1 or 2 degrees above the exterior environmental temperature. Thus, although moisture is continuously being removed from the housing, no substantial temperature loss is observed so that the drying efficiency is maintained at a very high level.

As an alternative a standard condenser of appropriate dimensions can be placed in the conduit beyond the product and the condensed moisture then withdrawn from the housing to the exterior environment through a suitable pressure valve which limits the amount of drying fluid which is exhausted so that heat loss is minimized and the pressure within the housing is maintained above atmospheric.

Since the moisture removed from the product to be dried is efficiently transferred to the exterior environment, the drying operation is not only efficient, but is also extremely rapid, and, as conducted in the drying of prunes, has provided equivalent drying to the desired 20 percent moisture level in a period one quarter of that of the conventional tunnel dryer described briefly hereinabove. Furthermore, because of the more rapid drying cycle, the dry weight of the product at the same dried moisture content is greater than that achieved with conventional dryers and less flavor loss is experienced so that the ultimate food product flavor is enhanced. Additional tests have indicated a reduction in the drying time for walnuts from an average of 30 hours to 5 hours and in the case of halved apricots, from 25 to 5 hours.

Additionally, even though the drying fluid is at an elevated temperature, the absence of oxygen in such fluid substantially precludes enzymatic action and the resultant deleterious effects on certain food products such as halved apricots.

Quite obviously, the dryer housing can take many shapes and forms depending upon the quantity and character of product being dried. For example, wire screen trays can be utilized to support prunes or apricots during the drying process and can be moved intermittently through the housing by a suitable conveyor mechanism. In turn, liquid products to be dried, such as orange juice, can be sprayed into a housing arranged to provide a recirculating contract of the drying fluid with the liquid in the form of small sprayed droplets and, in turn, granular material, such as alfalfa, can be moved by known mechanisms to establish contact with the recirculating drying fluid.

BRIEF DESCRIPTION OF THE DRAWINGS

The stated objective of the invention and the manner in which it is carried out as summarized hereinabove will be more readily understood by reference to the following detailed description of the exemplary embodiments of the invention, as shown in the accompanying drawings wherein:

FIG. 1 is a perspective view of a tray dryer utilized for drying prunes, apricots or other similar products, portions thereof being broken away to illustrate interior details, FIG. 2 is a vertical cross-section taken along line 2—2 of FIG. 1 illustrating additional interior details of the dryer apparatus, FIG. 2a is a fragmentary section indicating the feeding of a tray to the dryer, FIG. 2b is a similar fragmentary section illustrating withdrawal of a tray, FIG. 3 is an enlarged horizontal sectional view taken along line 3—3 of FIG. 2 illustrating yet further structural details, FIG. 4 is a diagrammatic view of the fuel-air control arrangement for the FIG. 1 structure, and FIG. 5 is a diagrammatic view of a high velocity tray dryer constituting a modified embodiment of the invention.

DETAILED DESCRIPTION OF THE EXEMPLARY EMBODIMENTS OF THE INVENTION

With initial reference to FIGS. 1–4, apparatus primarily designed for drying prunes, apricots, nuts, meat, or other solid products supported on trays T is illustrated, and as shown, takes the form of a generally rectangular L-shaped housing 10 whose exterior walls 12 are formed by sheets of standard ¾ inch exterior plywood held in their assembled relationship by frame members 14 composed of conventional angle iron, so that generally the housing is completely enclosed, although as will be discussed in greater detail hereinafter, the plywood walls 12 form a moisture permeable membrane allowing the transfer of moisture from the interior of the housing 10 to its exterior without substantial loss of heat. A central partition 16 which can also be formed of the same plywood or analogous moisture-permeable material essentially bisects the structure, extending from a position spaced downwardly from the top of the vertical portion of the L-shaped housing 10 to the bottom thereof and thence laterally to the end of the L-shaped housing, slight openings being left in the lower section of the vertical portion of the housing to permit passage therethrough of a pair of endless link conveyor chains 18 as best shown in FIG. 2. At the extremity of the base portion of the L-shaped housing 10, a fan 20 is placed in communication with the interior of the housing on one side of the partition 16 and a bent return pipe 22 is connected between the fan inlet and the end of the housing on the opposite side of the partition 16. Thus, drying fluid, whose precise nature is to be described hereinafter, is directed by the fan 20 through the base portion of the L-shaped housing 10 on one side of the partition 16, thence upwardly on the same side of the partition whereupon it is directed laterally through the space at the top of the housing and thence downwardly and outwardly through the base portion of the housing on the other side of the partition for return through the bent pipe 22 to the inlet side of the fan 20. Thus a closed loop conduit 24 is formed within the housing so that the drying fluid can be continuously recirculated therethrough.

In the base portion of the L-shaped housing 10 which is adjacent the exhaust of the described fan 20, a gas burner 26 is disposed (see FIG. 1), and, as will be explained in detail hereinafter is arranged to generate a substantially oxygen-free combustion product at a desired temperature to provide for efficient and rapid drying of the products which are disposed for intermittent movement in the vertical sections of the housing 10, upwardly through the left portion of the housing thence across to the right side of the partition 16, and finally downwardly as illustrated in FIG. 2. Thus, it will be seen that a parallel flow of the product and the drying fluid is achieved.

The solid products, such as prunes, apricots, nuts or the like, to be dried in the present embodiment of the invention are supported on trays T having rectangular outer frame elements that support a flat screen or other foraminous member which permits flow of the drying fluid therethrough. To support the trays T and allow their intermittent advance through the dryer conduit 24, the mentioned air of endless link conveyor chains 18 are carried by suitable sprockets 27 adjacent the front and rear of the housing 10, the chains pivotally supporting therebetween tray carriers 28 each of which takes the form of a pair of U-shaped inturned members arranged for the slidable reception of the trays in substantially horizontal positions as can best be visualized by reference to FIG. 2. The remote extremities of the tray carriers 28 are provided with laterally extended pins 30, as best shown in FIG. 3, which are arranged to engage continuous tracks 32 formed adjacent the side of the housing so as to maintain the tray carriers 28 in horizontal positions throughout their entire movement first upwardly, then across and finally downwardly through the continuous conduit 24. Drive means are arranged to intermittently advance the trays in the described path of motion through the conduit and as illustrated in FIG. 2 can take the form of an electric motor 34 suitably connected to the lower sprockets 27 in the housing and energized by a standard timer mechanism (not shown) which can be set to provide for the desired intermittent controlled advance of the trays therethrough depending upon the character of the product being dried. Specifically, the tray carriers 28 are advanced intermittently to positions aligned with entrance and exit positions for the trays, as will now be described in more detail.

A lateral tray entrance opening with a pivoted door 36 thereover is provided on the lower left side of the housing 10, as best shown in FIG. 2 to permit sequential insertion of trays T with products to be dried onto the tray carries 28 from a small feed chamber 38 of rectangular cross-section which slidably receives a tray feeder 40 which can be manually actuated to push an individual tray onto an adjacent tray carrier 28, as can best be visualized by reference to FIG. 2a. Such feeder 40 includes a head portion which can be of rectangular cross-section for close slidable reception in the feed chamber 38 and an attached handle 42. After an outer door 45 has been opened to provide access to the feed chamber 38, the feeder 40 is inserted to efffectively close the outer end of the chamber. The inner pivoted door 36 is then opened as shown in FIG. 2a by manual manipulation of an attached handle 44 and the feeder 40 is pushed to cause slidable insertion of the tray T onto the adjacent tray carrier 28. The feeder 40 is then withdrawn and the pivoted door 36 is closed before placement of another tray in the feed chamber 38. Thus, air-lock means for feeding trays without loss of drying fluid to the exterior environment is provided in a simple fashion although it is to be understood that other air-lock feeding mechanisms can be utilized so long as they substantially maintain the drying conduit 24 isolated from the exterior environment so that loss of drying fluid and reduced drying efficiency are avoided.

In a similar fashion, a pivoted tray exit door 46 with an attached handle 48 is positioned over an opening in the lower right of the housing 10, as shown in FIG. 2, adjacent an air-lock chamber 50 also of small rectangular configuration which slidably and closely receives the rectangular head portion of a tray extractor 52 that includes a pivoted and spring urged catch 54 at its inner end and a handle 56 at its outer extremity. When a tray T has arrived adjacent the exit door 46, the tray extractor 52 can be inserted after it and an outer door 55 is opened so that the catch 54 will cam over the tray rim as shown in FIG. 2b whereupon the tray T and extractor can be withdrawn whereupon the exit doors 46, 55 can again be closed. Again, the tray extraction can be performed without loss of drying fluid.

For purposes of "flash" blanching certain products such as apricot halves, a steam chest 58 is mounted on the side of the housing a sufficient distance above the tray entrance door 36 so that some moisture will have been removed prior to arrival of a given tray at the level of the steam chest. It has been found preferable in practice to have achieved approximately 50 percent reduction in the moisture content of apricots prior to a steam blanching operation. A door 60 is normally positioned over a lateral opening in the housing 10 but can be pivoted upwardly through actuation of an attached handle 62 and the individual tray thence manually pulled by a slidable tray engaging member 64 similar to the tray extractor 52 to enable grasping and subsequent withdrawal of an individual tray from its tray carrier 28 in the steam chest whereupon the pivoted door 60 is again closed and the apricots or other product to be blanched are exposed to steam supplied through a pipe 66 from a suitable source (not shown) typically for a period of about 15 seconds whereupon the tray can be once again returned by manipulation of the tray engaging member 64 to the interior of the dryer housing 10 for continued operation thereof. While a simple flash blanching mechanism is illustrated, it will be apparent that automatic tray handling equipment for the blancher can be incorporated if desired and can be controlled by the same timer mechanism that controls the intermittent advance of the trays through the drying apparatus.

While it is to be understood that various drying fluids can be employed with success in the described apparatus, it is preferred to utilize, as briefly mentioned hereinbefore, a drying fluid having substantially no oxygen content. For this purpose, the dryer incorporates the mentioned burner 26 for a given gas such as propane but a controlled supply of this combustible gas is mixed in proper ratio with air so that all of the oxygen in the incoming air is consumed during the combustion process to allow such control as well as the desired temperature in the drying apparatus. The burner 26 is supplied with a controlled mixture of gas and air as diagrammatically illustrated in FIG. 4. More particularly, the gas is supplied to the burner through one valve 66, and the air is supplied from a pressure blower 68 through another valve 70 to the burner and these valves are mechanically interconnected, as indicated by the dotted line so that if the amount of gas propane or otherwise, is increased, the air flow is correspondingly increased in direct proportion. The correlated opening or closing of the gas and air valves 66, 70 is in turn controlled by a temperature sensor 72 preferably physically stationed in the upper portion of the housing after a certain amount of moisture has been removed. If the temperature at such position drops below a predetermined level, both valves 66, 70 will open in proportion so as to increase the input temperature of the unit and in turn if the temperature rises above the desired level, a corresponding closing of the valves 66, 70 will provide immediate lowering of the temperature level.

If the proper settings of the gas and air valves are made, the drying gas constituting the products of combustion of the burner 26 have as a result of repeated tests included the following constituents in terms of range of percentages:

Carbon Dioxide    9.73 — 9.79
Carbon Monoxide    1.22 — 3.10
Oxygen    0.000 — 0.023
Hydrogen    1.77 — 2.89
Hydrocarbons (Acetylene, etc.)    0.000 — 0.000
Nitrogen    86.28 — 83.20
Argon    1.00 — 1.00
Aromatics    0.000 — 0.006

Of primary importance is the substantial absence of oxygen in the combustion products and since oxygen has deleterious effects on most all products such as halved apricots, as mentioned hereinbefore, the gas shall be denominated as an "inert gas," the term "inert" being used in the sense that enzymatic activity and other deleterious side effects on certain food products are substantially eliminated. Generally, when any food products are exposed to the drying operation in an apparatus such as hereinabove described, an efficient and rapid drying operation is performed. In the first place, it will be observed that since the drying fluid is continuously recirculated through the closed-loop conduit 24, but a minimal amount of the drying fluid will be exhausted to the exterior environment through the plywood and the joints therebetween, thus to minimize direct heat loss. The amount of leakage through the walls 12 and the joints therebetween is definitely restricted so that a positive pressure is maintained within the housing 10. Additionally, although the plywood walls 12 function as a moisture-permeable membrane to allow for the egress of accumulated moisture to the exterior environment, the plywood or any equivalent forms an effective heat insulator and but a minor heat loss through the walls 12 of the housing 10 is experienced. Thus, the described arrangement provides means for enabling egress of the moisture without substantial heat loss.

These conclusions are confirmed by a large number of tests one of which was performed on thin sliced onions (1/16 inch slice) laid on 40 trays in a drying apparatus as described hereinabove with input temperature from the burner 26 of approximately 130° F and with a fan velocity such that a pressure of approximately 1 inch of water above atmospheric was maintained in the housing during the operation.

Generally, the desired final moisture content of no more than 10 percent was attained within an eight hour drying period, and the resultant product was described as having good color, natural aroma, and taste.

Initially, reference to Table A indicates that the humidity inside the chamber gradually increased as the dryer was filled with trays but that the inside humidity gradually decreased thereafter, indicating the rapid drying rate. While the intake temperature was maintained at approximately the desired level of 130°F, the temperature at the top of the drying apparatus dropped considerably, indicating that the preponderance of moisture removal occurred during the initial elevation

TABLE A

| Number of trays in dryer | Time | Relative humidity (%) Inside | Relative humidity (%) Outside | Temperatures,° Intake | Temperatures,° Top | Temperatures,° Outside | Area |
|---|---|---|---|---|---|---|---|
| 1 | 9:45 | 18 | 64 | 132 | 112 | 84 | |
| 8 | 10:10 | 35 | 58 | 132 | 105 | 84 | |
| 10 | 10:20 | 40 | 55 | 132 | 105 | 84 | |
| 15 | 10:45 | 45 | 51 | 131 | 105 | 84 | |
| 20 | 11:00 | 48 | 51 | 130 | 100 | 84 | |
| 22 | 11:35 | 62 | 48 | 130 | 100 | 92 | |
| 24 | 11:45 | 72 | 47 | 130 | 105 | 94 | |
| 27 | 12:05 | 72 | 45 | 130 | 105 | 95 | |
| 30 | 12:40 | 72 | 49 | 128 | 105 | 92 | |
| 40 (full) | 1:15 | 72 | 48 | 130 | 110 | 94 | |
| 40 | 2:00 | 55 | 45 | 130 | 115 | 98 | |
| 40 | 2:30 | 45 | 42 | 130 | 115 | 99 | 96 |
| 40 | 2:45 | 39 | 41 | 130 | 115 | 99 | 98 |
| 40 | 3:00 | 35 | 41 | 130 | 117 | 99 | 98 |
| 40 | 3:15 | 31 | 40 | 130 | 117 | 100 | 98 |
| 40 | 3:30 | 27 | 38 | 130 | 117 | 101 | 98 |
| 40 | 3:45 | 25 | 38 | 130 | 117 | 101 | 98 |
| 40 | 4:00 | 23 | 37½ | 130 | 117 | 100 | 98 |
| 40 | 4:15 | 19 | 36½ | 130 | 117 | 100 | 98 |
| 40 | 4:30 | 18 | 36 | 130 | 118 | 100 | 98 |
| 36 | 4:45 | 16 | 35 | 130 | 120 | 100 | 98 |
| 36 | 5:00 | 15 | 35 | 130 | 120 | 99 | 96 |
| 36 | 5:15 | 15 | 35 | 130 | 120 | 99 | 96 |
| 36 | 5:30 | 15 | 36 | 130 | 120 | 99 | 96 |
| 36 | 5:45 | 15 | 35½ | 130 | 120 | 99 | 96 |
| 36 | 6:00 | 15 | 37½ | 130 | 120 | 100 | 96 | of the trays. It is to particularly observed that a substantial temperature drop between the interior and exterior of the dryer was observed and moreover that the temperature immediately exterior to the dryer was but slightly above the environmental temperature, thus indicating substantially no heat loss through the walls of the structure. Because of the slight positive pressure within the dryer and additionally because of the considerable temperature gradient between the exterior and interior of the housing walls, a considerable moisture flow therethrough was obviously experienced in view of the rather rapid decrease in the relative humidity within the dryer after the maximum capacity of 40 trays was established.

Many other food products including Gravenstein apple sticks, raspberries, watermelon, Persian melon, beef jerky, liver, ginger fish, bellpeppers, turnips, tomatoes, black-eyed peas, beets, carrots, turnips, mushrooms, quince, celery, chicken, apricots and prunes have been dried with generally similar results. In each case, the drying was more rapid than with conventional mechanisms and the drying costs per pound were reduced. By way of example, the drying cost per pound of green prunes is approximately 1 ½ cents with an average drying time of 20 hours in a conventional tunnel dryer. The drying apparatus of the present invention, on the other hand, correspondingly reduced the moisture content of green prunes to the desired 20 percent level in approximately 5 hours and at a cost of less than 1 cent per pound. Furthermore, on an average, the dry weight of the prunes at the same 20 percent moisture level was approximately 10 percent greater than that of those dried in the conventional tunnel dryer operation, and the sugar content was correspondingly maintained at this higher level. Thus, this drying apparatus is not only more efficient and rapid in its operation, but, in general terms, produces a more desireable end product.

While one specific structure has been shown and described in connection with the drying of a number of fruits and vegetables, it is apparent that the general concept of recirculating a drying fluid through a closed conduit having walls which are moisture permeable can have a wide variety of detailed structural and operational variations. By way of example, a slightly modified arrangement also generally providing for the drying of products on trays is diagrammatically illustrated in FIG. 5. A closed-loop conduit 72 is again provided with a burner 74 and the fan 76 arranged to generate and circulate an inert gas therearound as indicated by the arrows but having a metal or other moisture impervious housing 78 which precludes the egress of moisture. One distinguishing feature of this slightly modified arrangement is that the trays T are disposed for movement only downwardly from an entrance chamber 80 through one side of the closed loop conduit 72 to an exit chamber 82 so that the pressure of drying fluid is directed downwardly thus to create a force which maintains the fruit or vegetables on the supporting trays. Accordingly, the fan can be run at a very high speed to create a fluid velocity of 100 miles per hour without dislodging the supported product. Since it is known that high velocity drying fluids will accelerate the entire drying process, the arrangement shown in FIG. 5 will yet further accelerate the drying process without any substantial loss in its efficiency.

Additionally, since the walls of the housing 78 are moisture-impermeable, the means for moisture-removal without substantial heat loss takes a modified form. More particularly, a standard condenser 84 is disposed adjacent the bottom of the housing and below the lowest trays T so as to be contacted by the moisture laden drying fluid. The moisture is condensed and drops through an exhaust chute 86 and a pressure flap valve 88 to the exterior. A spring 90 connected to the valve 88 enables its opening when a positive pressure of, for example, 3 p.s.i. (above atmospheric) is attained within the housing 78. The water is discharged and slight leakage of drying fluid maintains the desired pressure in the conduit 72 without substantial heat loss.

While the foregoing embodiments of the invention have been primarily concerned with the drying of fruits and vegetables, the same principle can be applied to the drying of other products including liquids and granular materials by the mere utilization of standard equipment for the particular material. More particularly, various housing configurations can be employed and the burner and fan can be arranged within or without the recirculating conduit to meet the particular structural and functional requirements for drying a particular product. For example, a counter-current flow of fluid and product is most desireable for the drying of apples.

Yet other modifications and alterations can be made without departing from the spirit of the invention and the foregoing description of but two embodiments is to be considered only as exemplary and not in a limiting sens. The scope of the invention is to be construed only by reference to the appended claims.

What is claimed is:

1. Drying apparatus which comprises
 a housing arranged to form a continuous closed-loop conduit therewithin,
 means for introducing a drying fluid into said conduit to recirculate in a path around said closed-loop conduit,
 means for placing a product to be dried in said conduit in the path of fluid recirculation whereby moisture in the product is transferred into the drying fluid, and
 moisture removal means enabling moisture to pass from the interior to the exterior of said housing without substantial loss of heat.

2. Drying apparatus according to claim 1 which comprises
 means including a burner for generating an inert gas at an elevated temperature to provide said drying fluid.

3. Drying apparatus according to claim 2 wherein
 said product placing means includes an air-lock means enabling introduction of the product without loss of drying fluid.

4. Drying apparatus according to claim 1 which comprises
 means for moving the product through said conduit.

5. Drying apparatus according to claim 4 wherein
 said product moving means includes a plurality of trays supporting the product and means arranged to move the trays successively through said conduit.

6. Drying apparatus according to claim 3 which comprises
 air lock means for removing the product from said conduit.

7. Drying apparatus according to claim 4 which comprises
 a steam chest adapted for selected communication with said conduit a predetermined distance along the path of product motion in said conduit.

8. Drying apparatus according to claim 1 wherein
 said moisture removal means includes a moisture-permeable membrane formed by housing walls of plywood material.

9. Drying apparatus according to claim 1 which comprises
 means for establishing a pressure above atmospheric in said housing.

10. Drying apparatus according to claim 1 which comprises
 a fan for moving the drying fluid in the recirculating path through said conduit.

11. Drying apparatus according to claim 10 which comprises
 means for moving products on trays in a downward portion of said conduit and wherein said fan is arranged to move the drying fluid downwardly against the product.

12. Drying apparatus according to claim 1 wherein
 said moisture-removal means includes a condenser in said housing and a pressure valve for discharging the condensed moisture.

13. Drying apparatus according to claim 1 wherein
 said moisture removal means includes a moisture-permeable membrane forming a substantial portion of said housing walls.
 said moisture-removal means includes a condenser in saidhousing and a pressure valve for discharging the condensed moisture.

* * * * *

UNITED STATES PATENT OFFICE
CERTIFICATE OF CORRECTION

Patent No. 3,809,530       Dated May 7, 1974

Inventor(s) William A. Gerrans

It is certified that error appears in the above-identified patent and that said Letters Patent are hereby corrected as shown below:

Column 10, lines 62 - 64, cancel "said moisture-removal means includes a condenser in saidhousing and a pressure valve for discharging the condensed moisture."

Signed and sealed this 1st day of October 1974.

(SEAL)
Attest:

McCOY M. GIBSON JR.
Attesting Officer

C. MARSHALL DANN
Commissioner of Patents